April 17, 1956     W. E. WINDSOR, JR., ET AL     2,741,921

HYPSOMETER

Filed Dec. 22, 1952

INVENTORS
Walter E. Windsor, Jr.
Frederick Sobel.

BY Robert F. Peck

ATTORNEY

United States Patent Office 2,741,921
Patented Apr. 17, 1956

2,741,921
HYPSOMETER

Walter E. Windsor, Jr., San Diego, Calif., and Frederick Sobel, Baltimore, Md., assignors to Bendix Aviation Corporation, Baltimore, Md., a corporation of Delaware Application December 22, 1952, Serial No. 327,196

8 Claims. (Cl. 73—384)

This invention relates generally to improvements in that class of pressure measuring devices known as "hypsometers," and in particular relates to improvements in hypsometers designed to measure extremely low pressure and adapted to be carried aloft by a free-moving balloon into the upper atmosphere.

The temperature at which a liquid boils is a unique function of the pressure above the liquid. By measuring the temperature of the saturated vapor of a boiling liquid it is possible to measure the ambient pressure, if the vapor pressure-temperature relation for the liquid is known. This principle of operation is fundamental to the operation of the hypsometer disclosed herein, and the novel improvements contribute to improved performance, reduced cost, reduced weight, and increased ruggedness over similar devices heretofore developed.

It has been found that the vapor temperature existing at or very near the surface of a boiling liquid accurately reflects the ambient pressure whereas at greater distances from the liquid surface, convection and conduction effects introduce variables into the vapor temperature which affect its ability to accurately mirror ambient pressure or changes thereof. One of the features limiting the accuracy of performance in the devices of the prior art was the arrangement of the temperature responsive element at a fixed position within the container of a boiling liquid. As the liquid evaporated, the distance between the temperature responsive element and the level of the liquid varied, and this variation was sufficient to cause progressive inaccuracies in the measuring of ambient pressure.

The novel arrangement shown herein provides a mounting for the temperature responsive element which maintains a fixed distance between the element and the level of the liquid at all times, regardless of changes in the liquid level. A miniature thermistor has been found to be eminently suited for the temperature measuring element and by mounting the thermistor on a cork float, the aforesaid fixed relation of the thermistor to the liquid level is maintained throughout the operating cycle of the hypsometer. A suitable wick is provided, having portions thereof in contact with both the liquid and the thermistor so that the vapor temperature surrounding the thermistor follows very closely the changes in ambient pressure.

In addition to mounting the thermistor on a float, a novel arrangement has been provided to guide the float in its motion within the liquid container in such a way that the float cannot be turned over during normal operation, and further, the arrangement prevents any tendency of the thermistor wires to twist and possibly break.

Additionally, the materials selected for the liquid container and its surrounding insulation means contribute to a decrease in weight over prior devices and at the same time reduce the fragility of the unit by the elimination of glass type containers. This factor is of significant importance when consideration is given to the use of the novel hypsometer as a component of a high-altitude balloon-borne radiosonde device.

The above improvements and novel features, together with the benefits and advantages derived therefrom will be best understood upon reference to the detailed specification set forth below, when taken in conjunction with the drawings annexed hereto, in which.

Figure 1:
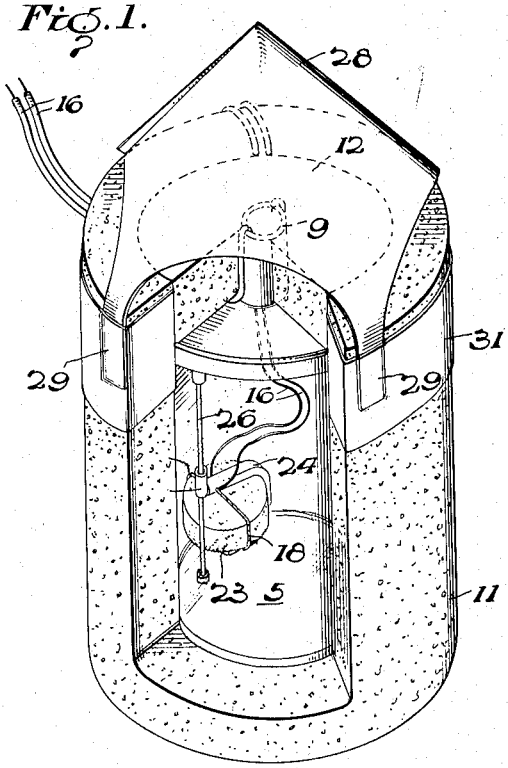
Figure 1 is a perspective view of the complete assembly, with a portion of the insulation removed to show the arrangement of parts within the liquid container.

The improved hypsometer comprises a liquid container 5 generally cylindrical in form, having a side wall 6 and upper and lower walls 7, 8. It has been found that by molding the container from nylon or equivalent material, an excellent container is provided.

The upper wall 7 of the liquid container has a centrally located aperture 8 formed by an upwardly projecting extension in the form of a chimney 9.

Surrounding the liquid container is a jacket of insulating material in the form of a sleeve 11, having ends which project beyond the upper and lower walls of the liquid container to receive circular plugs 12, 13, whereby all of the external surfaces of the liquid container are adequately insulated from the atmosphere. The plug 12 is properly apertured so as to cooperate with the chimney 9 extending up from the upper wall of the liquid container. It has been found that an expanded polystyrene material is quite suitable for use as the insulating members and it is to be noted that the combination of a nylon container with an expanded polystyrene insulation jacket provides an extremely light-weight device not at all fragile when compared to a conventional glass-vacuum container of the type heretofore used. Moreover, the combination provides substantially complete insulation as there is no significant heat loss in a three hour operating cycle during which the ambient temperature may progressively decrease from plus 40 degrees C. to minus 80 degrees C.

Within the liquid container there is provided a quantity of liquid carbon disulphide 14 which only partially fills the container. In a manner well known to those skilled in the art, it is to be understood that the carbon disulphide readily boils under conditions of extremely low ambient pressure and that the temperature of its saturated vapor is a function of the ambient pressure above the carbon disulphide. By measuring the aforesaid vapor temperature, means are provided to measure the ambient pressure, and to this end a thermistor 15 is provided having suitable external leads 16 for connection to an electrical measuring circuit.

In the case of a hypsometer adapted to be used with a free balloon, the leads 16 may be connected to a simple radio transmitter, also carried by the balloon, so that the changes in temperature, which reflect changes in ambient pressure, can be translated into a variable frequency radio signal, which in turn can be received with suitable ground equipment and converted into true values of pressure. The external electrical circuit and associated balloon-borne radio transmitter, ground equipment, etc., form no part of the subject invention, and because such systems are well known in the art, further discussion thereof has been eliminated to retain simplicity and brevity in this specification.

It is well to note that the leads 16 pass through the aperture 8 and are folded over the walls of chimney 9 and run underneath of the insulation plugs 12. These leads are very thin and fragile, and the aforesaid arrangement holds them compactly and in such a way that possible breakage of the leads is minimized.

The thermistor 15 is in the form of a miniature bead 17 of sintered metallic oxides (about the size of the head of a pin) and has a pair of electrodes 18, 19 integral therewith. Surrounding the bead and about one-quarter inch of the electrodes, a fused glass body 21 is provided to give the assembly some mechanical strength. Thus, the complete thermistor assembly comprises a small rod of glass having the bead and a portion of the electrodes embedded therein.

As heretofore mentioned in the specification, the position of the thermistor 15 with respect to the liquid level 22 must be fixed for all changes in the liquid level for maximum accuracy in performance. This fixed position is provided by mounting the thermistor 15 on a float in the form of a cork disc 23. In mounting the thermistor 15 on the cork 23 it is first inserted into the open end of a wick 24, formed of cotton, nylon or equivalent material, the other end of the wick being wrapped around the edge of the float and doubled upon itself on the under side of the cork float.

Figure 2:
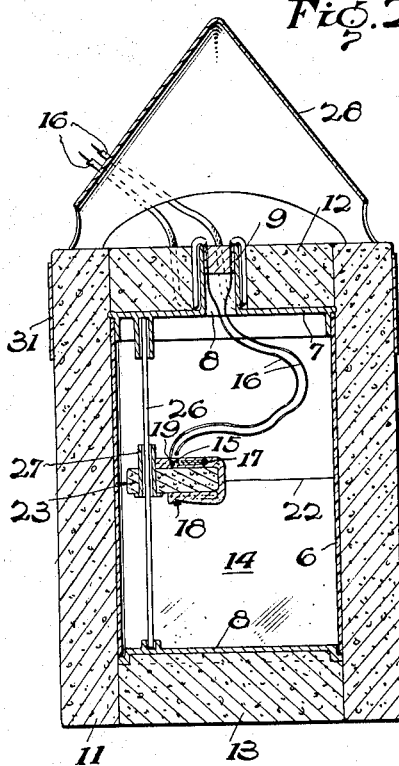
Figure 2 is a sectional view in elevation of the improved hypsometer.
Figure 3:
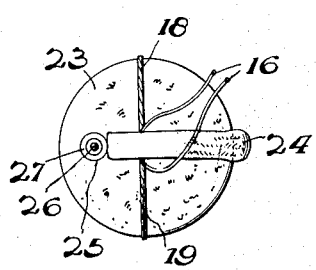
Figure 3 is a view looking down on the upper surface of the float.
Figure 4:
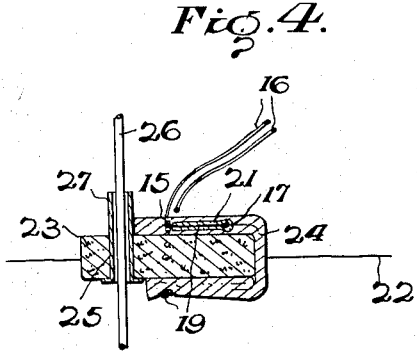
Figure 4 is an enlarged sectional view of the float and a portion of its associated guide means.

To hold the wick and associated thermistor in place on the cork, the liquid-contacting end of the wick may be stapled to the under-side of the cork. On the upper side of the cork, the electrodes 18, 19 are brought through the sides of the wick and tightly drawn around opposite edges of the cork, the free ends thereof being suitably embedded into the cork. The external leads 16 are properly affixed to the electrodes on opposite sides of the wick (as best shown in Figure 2).

To prevent the cork 23 from moving freely over the surface of the confined liquid, which might lead to partial immersion of the thermistor or twisting and breaking of the lead wires 16, an eccentrically located aperture 25 is provided in the cork, through which vertical guide rod 26 passes, the ends of the guide rod 26 being suitably mounted in the upper and lower walls of the liquid container. A suitable metal eyelet 27 is pressed into the cork surrounding the guide rod to provide smooth action during relative motion of the float with respect to the rod. The eccentric location of the aperture 19 permits the float to oscillate through a limited arcuate path, further motion being limited by contact of the sidewalls of the float with the side wall of the liquid container. Thus the said side wall constitutes an abutment for limiting arcuate movement of the float. This limited arcuate motion prevents twisting of the leads 16 without in any way affecting the ability of the float to properly follow changes in liquid level.

A plastic rain shield is provided to cover the aperture 8 and consists of a cone-shaped element 28, having a series of downwardly projecting tabs 29, the shield being held in place by means of suitable adhesive tape 31 surrounding the upper end of insulation jacket 11 and overlying the tabs 29.

With the above arrangement of parts in mind, let us assume operation of the device in conjunction with a balloon-borne radiosonde ascending at the rate of 1,000 feet per minute. It has been found that an operating cycle of three hours will provide for complete information during such a flight, and to this end, about 35 grams of carbon disulphide are required. The liquid container is in the order of 2 inches high and 1½ inches in diameter, there being about ½ inch of insulation surrounding the container.

With an ambient surface temperature no greater than plus 40 degrees C. (and no less than the vapor temperature corresponding to the pressure sought to be measured), the hypsometer will measure pressures in the range of 100 millibars or less with a maximum error of plus or minus 5%.

No external source of heat is required for this type of operation, particularly in view of the excellent insulation provided by the expanded polystyrene in minimizing heat losses by conduction through the container. Because the liquid boils throughout its flight cycle, there is no significant penetration of outside cold air because of the slight pressure differential created by the outward flow of vapor from the container.

What is claimed and desired to be secured by United States Letters Patent is:

1. A pressure measuring apparatus, comprising: a container, a liquid within said container and partially filling same, said liquid being subjected to an ambient pressure and being of such a nature that it boils throughout a predetermined range of ambient pressures, said boiling creating an atmosphere of vapors of said liquid within said container, said vapors having a temperature dependent upon said ambient pressures, a temperature responsive element for sensing said temperature, a support for said element, and means mounting said support adjacent the surface of the liquid within the container in a manner such that it moves freely in response to changes in level of the liquid and in a direction substantially perpendicular to the surface thereof for the purpose of maintaining constant the distance between said element and said surface as the volume of the liquid changes due to vaporization.

2. A pressure measuring apparatus comprising: a container, a liquid within said container and partially filling same, said liquid being subjected to an ambient pressure and being of a nature such that it boils freely throughout a predetermined range of ambient pressures, said boiling creating an atmosphere of vapors of said liquid within said container, said vapors having a temperature dependent upon said ambient pressures, a temperature responsive element for sensing changes in said temperature, a floating support for said element, said support being buoyed up by the liquid and being free to move in response to changes in the level of said liquid, said temperature responsive element being carried by said support above the level of the liquid, and a capillary element having portions contacting both said temperature element and said liquid.

3. The combination as defined in claim 2, wherein means are provided for guiding said support in a fixed path substantially perpendicular to the surface of the liquid.

4. The combination as defined in claim 2, wherein said temperature responsive element comprises a miniature thermistor having electrical leads affixed thereto and extending upwardly from the thermistor through an aperture in the upper surface of said container.

5. The combination as defined in claim 2 wherein said liquid comprises carbon disulphide.

6. The combination as defined in claim 4 wherein a rain shield is provided to cover said aperture in the upper surface of said container.

7. A pressure measuring apparatus comprising: a container, a liquid within said container and partially filling same, said liquid being subjected to an ambient pressure and being of a nature such that it boils freely throughout a predetermined range of ambient pressures, said boiling creating an atmosphere of vapors of said liquid within said container, said vapors having a temperature dependent upon said ambient pressures, a temperature responsive element for sensing changes in said temperature provided with electrical leads adapted to be connected to an electrical measuring circuit, a support for said element in the form of a floating disc having an aperture extending vertically therethrough and located eccentrically with respect to the vertical axis of the disc, said disc being buoyed up by the liquid and being free to move in response to changes in the level of said liquid, a vertical guide rod extending between the upper and lower surfaces of said container and through said aperture, abutment means located adjacent the vertical path of said disc for limiting its arcuate movement about said rod to thereby obviate twisting of said electrical leads, said temperature responsive element being carried by said disc above the level of the liquid, and a capillary element having portions contacting both said temperature element and said liquid.

8. The combination as defined in claim 7 wherein said capillary element consists of a relatively short wick having its one end contacting said temperature element adjacent the upper surface of said disc and its other end contacting said liquid adjacent the lower surface of said disc.

References Cited in the file of this patent

UNITED STATES PATENTS

| | | |
|---|---|---|
| 2,102,615 | Cubete | Dec. 21, 1937 |
| 2,599,276 | Norman | June 3, 1952 |

FOREIGN PATENTS

| | | |
|---|---|---|
| 519,083 | Great Britain | Mar. 15, 1940 |

OTHER REFERENCES

General News Bureau news release for May 6, 1949, General Electric, Schenectady 5, N. Y., 3 pp.

Suomi et al.: Review of Scientific Instruments, vol. 23, #6, June 1952, pp. 274 and 278.